Figure 1:
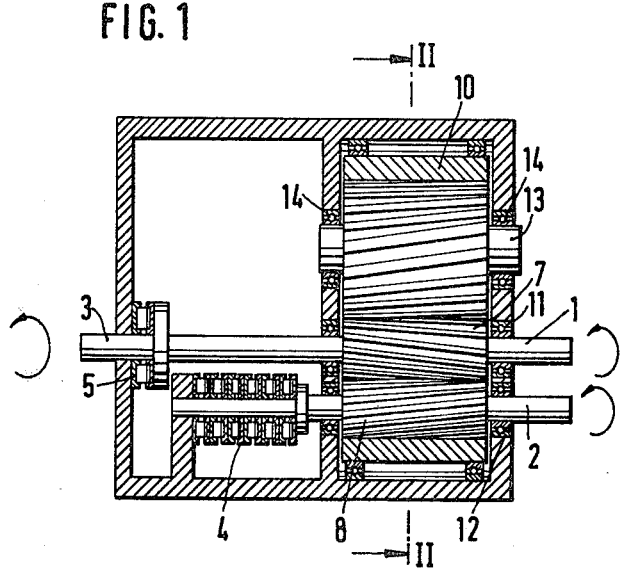

United States Patent [19]

Selbach et al.

[11] 4,170,150

[45] Oct. 9, 1979

[54] DRIVE UNIT FOR EXTRUSION DEVICE

[76] Inventors: Hans-Werner Selbach, Turmstr. 30, 4970 Bad Oeynhausen 7; Manfred Diekmann, Loblenzer Str. 31a, 4972 Lohne 3, both of Fed. Rep. of Germany

[21] Appl. No.: 790,755

[22] Filed: Apr. 25, 1977

[30] Foreign Application Priority Data

Apr. 30, 1976 [DE] Fed. Rep. of Germany ....... 2619019

[51] Int. Cl.$^2$ .............................................. F16H 57/00
[52] U.S. Cl. ..................................................... 74/410
[58] Field of Search .................. 74/410, 411, 805, 789, 74/665, 52

[56] References Cited

U.S. PATENT DOCUMENTS

| 2,316,114 | 4/1943 | Thompson | 74/52 |
| 3,824,875 | 7/1974 | Willert | 74/410 |

Primary Examiner—Samuel Scott
Assistant Examiner—Wesley S. Ratliff, Jr.
Attorney, Agent, or Firm—Salter & Michaelson

[57] ABSTRACT

A drive unit for use with extrusion devices having counter-rotating double screws with parallel axes overcomes problems with loading of the bearings of such units.

The drive unit has an integral drive and output shaft with a pinion mounted on the output shaft. Two cog wheels or gears mesh with the pinion on opposite sides thereof and one of the cog wheels is mounted on a second output shaft. The other cog wheel acts as an intermediate gear wheel and both cog wheels mesh with an internally toothed hollow gear wheel or ring gear. By making the diameter of the intermediate gear wheel greater than the diameter of the pinion, conventional bearings can be used.

1 Claim, 2 Drawing Figures

DRIVE UNIT FOR EXTRUSION DEVICE

This invention relates to drive units for extrusion devices particularly for such devices having counter-rotating double screws.

Drive units for extrusion devices are known in which counter-rotating double screws are able to mesh with one another. The construction of such extrusion device drive units is particularly difficult when the double screws are arranged with parallel axes since in this form of construction, in contrast to double screw arrangements which diverge in wedge form, the space relationships are very cramped.

The invention relates to an extrusion device drive unit for double screws arranged with parallel axes and in counter-rotation which are able either to mesh or not to mesh with each other, in other words the requirement is made that the angular velocities of the driving shafts of the drive unit co-ordinated with the double screws should be equal.

From the point of view of industrial technology, that is to say relative to the plastification of the extrudate, both extrusion screws should be loaded as equally as possible and thus the additional requirement is set for the constructor of the extrusion device drive unit that torque of substantially equal moment should be transmitted to each of the double screws through the driving shafts.

In known extrusion device drive units of this type the design of the driving shafts is especially critical. It is desirable that the dimensions of the driving shafts should be as large as possible in order to keep load deflection of the driving shafts, resulting from the gearing forces, as low as possible. The desired large dimensions cannot, however, be achieved in practice since—as already stated—the space relationships are very cramped particularly for counter-rotating double screws arranged with parallel axes and meshing with each other. Therefore it is necessary to take deflection of the driving shafts into consideration.

The deflection of the driving shafts is not constant, the course of the deflection curve bending line depends, rather, on the working load on the double screws at any given time. This leads to a continuously changing unfavourable load on the radial bearings of the driving shafts which compels the constructor to employ expensive special bearings in order to ensure a long useful life for the extrusion device drive unit or of its bearings.

A special bearing often used for this purpose is a multiple row roller bearing. But even this bearing can be optimally designed only for one predetermined deflection curve bending line of the shafts. Any deviation leads to an undesirable edge running of the bearings with the result that, for example, the bearing may fail prematurely for the sole reason that the double screws extrusion device is operated predominantly below its nominal load, which happens relatively often in practice.

Other forms of extrusion device drive unit have, for this reason, ball bearings with adjustable angle in which the race-ways are, of course, still cut cylindrically but the external body of the ball bearing has a cambered section so that the bearing together with its external body can adjust itself to changes in the deflection curve bending line. The cambered grinding of such bearings with adjustable angle is, however, very expensive.

These problems relative to the life of the extrusion device drive unit or its bearings have become much more important because of the increase in the capacity of double screw extrusion devices which has been demanded in recent years. While previously with space relationships corresponding to an axial separation of, for example, 90 mm between the extrusion screws a maximum production rate of 80 kg/hr was required, at the present time, with the same axial separation, the devices are often operated at a five-fold rate of production.

The object of the invention is to design an extrusion device drive unit of the above-mentioned type which, even at high production rates, achieves as high as possible a life at the lowest manufacturing costs.

In order to achieve this object, a starting point was an extrusion device drive unit which is remotely similar to a planetary gearing but which is not comparable to it since it does not serve for step-up or step-down gearing, but is used only for the uniform distribution of torque from the driving shaft to two take-off shafts arranged spaced from and parallel to each other and associated with the double screws.

The driving shaft is designed as a continuous shaft and so is also one of the take-off shafts. On this latter shift there is seated, as it were as a sun wheel, a pinion, by means of which half the driving torque is distributed between two cog wheels so that each receives $\frac{1}{4}$ of the torque, respectively. The cog wheels are mounted in bearings in a fixed position within the housing of the drive unit and one of the cog wheels is seated on the second take-off shaft and thus transfers its $\frac{1}{4}$ torque, taken directly from the pinion, to the second take-off shaft. The other cog wheel, called the intermediate gear wheel in the following, transfers the $\frac{1}{4}$ torque which it takes from the pinion to a free-rotating, internally toothed hollow wheel which engages simultaneously with the cog wheel on the second take-off shaft and with the intermediate gear wheel. In this way the remaining $\frac{1}{4}$ torque also reaches the second take-off shaft through the intermediate gear wheel and the hollow wheel, although by an indirect path.

The advantage of such a drive unit for branching of power, in which a cog wheel and an intermediate gear wheel are arranged to be situated opposite to each other on opposite sides of a pinion is that the forces of action and reaction on the pinion seated on the continuous driving and take-off shafts and on the cog wheel of equal size seated on the second take-off shaft are mutually compensated so that both take-off shafts are free from undesired deflections and corresponding loads on their radial bearings. Therefore, relatively small bearings of a normal commercial type can be used for these radial bearings. An important disadvantage however still remains, that is that the shaft of the intermediate gear wheel is still subjected to deflections dependent on loading since the gear forces do not mutually cancel out on the unbraked intermediate gear wheel.

This disadvantage is eliminated in an extrusion device drive unit according to the invention in that the intermediate gear wheel is designed to be significantly larger than the pinion or the cog wheel of the same size on the second take-off shaft. By this means sufficient space is acquired for mounting the one remaining critical radial bearing of the intermediate gear wheel shaft so that the shaft of the intermediate gear wheel can easily be sufficiently over-sized. Thereby undesired deflection of the shaft of the intermediate gear wheel can be avoided according to this teaching in such a way that it is possible to use normal commercial bearings for this sole remaining critical radial bearing.

The exclusive use of normal commercial radial bearings for such an extrusion device drive unit gives rise to an important advantage in the manufacture, life and ease of repair of the unit which in spite of all previous efforts has not been previously achieved.

Figure 2:
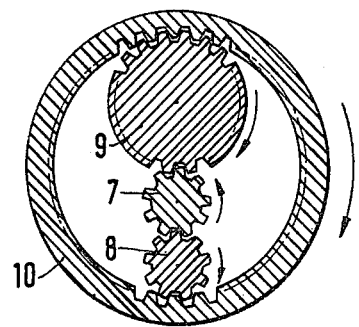

One embodiment of the invention is now described by way of example with reference to the drawings, in which:

FIG. 1 is a cross-section through an extrusion device drive unit according to the invention, and FIG. 2 is a schematic cross-sectional view seen on the line II—II of FIG. 1 showing the meshing of the gears.

The extrusion device drive unit illustrated has two take-off shafts 1 and 2 which are arranged with their axes parallel to co-operate with a double screw extrusion device. The driving shaft 3 of the unit is designed to be continuous and practically identical with the take-off shaft 1. The reaction pressure forces from the extrusion screws which act on the take-off shafts 1 and 2 are accepted by a tendem bearing 4 and an axial roller bearing 5 as in the normal constructional design of such drive units.

A pinion 7 is mounted on the take-off shaft 1 and meshes with the cog wheel 8 seated on the take-off shaft 2. At the same time the pinion 7 engages with the intermediate gear wheel 9 and both the intermediate gear wheel 9 and the cog wheel 8 mesh with a rotating internally-toothed hollow wheel 10.

An extrusion device drive unit of this type serves for branching of power, in such a way as to make equal torsion and equal angular velocities available at the take-off shafts 1 and 2, respectively. This is brought about by the fact that one half of the torsion delivered through the driving shaft 3 is taken up by the take-off shaft 1. The other half of the torsion is branched by means of the pinion 7 and is partly transferred to the cog wheel 8 and partly to the intermediate gear wheel 9. The fraction of the torsion transferred to the intermediate gear wheel 9 is again led to the cog wheel 8 indirectly through the hollow wheel 10 so that the take-off shaft 2 also has available to it, in total, half the input torsion.

If the forces of action and reaction resulting from the gearing are taken as is shown in FIG. 2, then it can be seen that these forces cancel each other out on the pinion 7, braked by the extrusion screws, and on the cog wheel 8. The take-off shafts 1 and 2 are thus subjected to zero deflection and the choice of suitable radial bearings 11 or 12, for these shafts, is therefore relatively easy.

A different situation arises on the unbraked freely following intermediate gear wheel 9 at which no cancellation of gear forces occurs. However, according to the invention, this intermediate gear wheel 9 is chosen to be significantly larger than the pinion 7 or the cog wheel 8 of the same size. By this means sufficient space is acquired for the mounting of the shaft 13 of the intermediate gear wheel with its corresponding radial bearings 14 to ensure that the intermediate gear wheel shaft can be sufficiently over-sized so that no appreciable deflections of the shaft 13 of the intermediate gear wheel will appear. As a result it is possible for the corresponding radial bearing 14 to be designed in a normal commercial manner.

What we claim as our invention and desire to secure by Letters of Patent of the United States is:

1. A drive unit for imparting low deflection rotation in opposite directions to first and second parallel axes output shafts in close proximity to each other, said drive unit including a ring gear in which first and second equal size pinion gears together with an intermediate gear of greater size are disposed, a drive shaft disposed on the input size of said unit, said drive shaft and said first output shaft each connected to said first pinion gear and extending from opposite sides thereof, said second pinion gear connected to said second output shaft, said first pinion gear meshed with both said second pinion gear and said intermediate gear, both the second pinion gear and the intermediate gears meshed with said ring gear with the axes of all of said gears being located in a common plane, said intermediate gear having a supporting shaft of greater diameter than those of the output shafts.

* * * * *